June 19, 1951    B. M. LEECE ET AL    2,557,298
VEHICLE ELECTRICAL SYSTEM
Filed May 20, 1946    3 Sheets-Sheet 2

INVENTOR.
BENNETT M. LEECE
BY SEYMOUR FLOYD STEWART
Kwis, Hudson, Boughton & Williams
ATTORNEYS

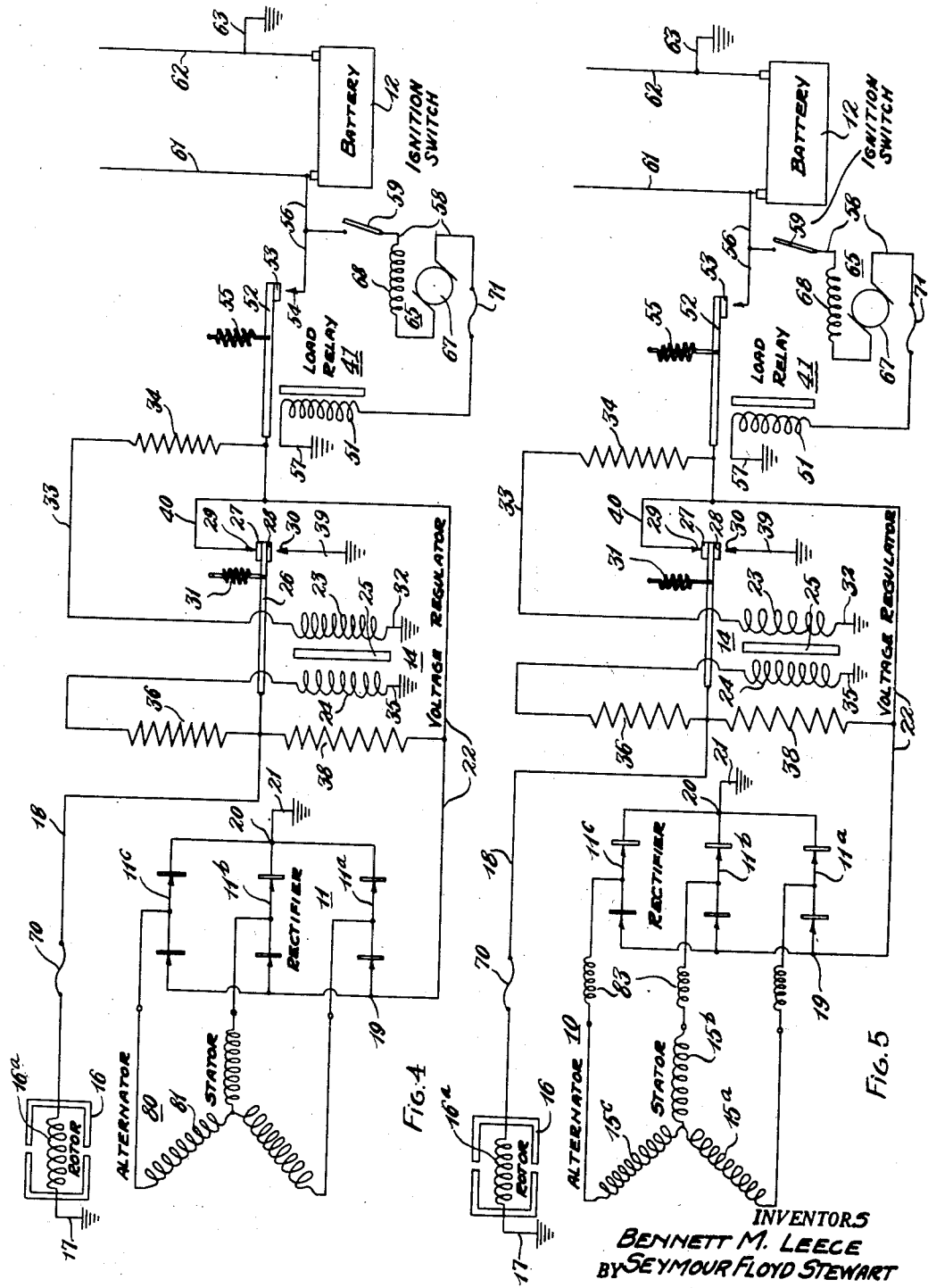

Patented June 19, 1951

2,557,298

UNITED STATES PATENT OFFICE 2,557,298

VEHICLE ELECTRICAL SYSTEM

Bennett M. Leece and Seymour Floyd Stewart, Shaker Heights, Ohio, assignors to The Leece-Neville Company, Cleveland, Ohio, a corporation of Ohio Application May 20, 1946, Serial No. 670,887

10 Claims. (Cl. 290—50)

This invention relates to electrical systems for motor vehicles having a variable speed internal combustion driving engine and, as one of its objects, aims to provide an improved system of this kind in which a considerably higher output of electrical energy can be obtained for lower engine speeds than has been possible in the vehicle electrical systems heretofore devised. This improved system is applicable to all vehicles driven by a variable speed internal combustion engine, including automobiles, aircraft, rail cars and marine vessels.

Another object of the present invention is to provide an improved vehicle electrical system of this character, in which an alternator driven by the variable speed vehicle engine delivers current through a rectifier to a direct current load which may consist of, or include, a storage battery.

Still another object of the invention is to provide an improved electrical system of the character mentioned, in which the alternator is automatically controlled by a voltage regulator which cooperates with the alternator and rectifier so as to maintain a desired substantially constant voltage at the D. C. terminals of the rectifier.

A further object of this invention is to provide an improved electrical system of the character referred to, which is further controlled by a load limitor or current regulator and by a load relay.

Another object of the invention is to provide an improved electrical system of this character, in which the rectifier is cooled and wherein such cooling is accomplished in a novel manner.

As a further object this invention provides an improved electrical system of this kind, wherein the alternator is driven by a variable speed vehicle engine having a rotary cooling device and in which the rectifier is cooled by said cooling device.

Yet another object is to provide an improved electrical system of the character mentioned in which the voltage made available by the alternator through the rectifier is automatically controlled and wherein the maximum output of the alternator is controlled or limited to a desired value by reactance embodied either in the alternator or elsewhere in the system for this purpose.

The invention can be further briefly summarized as consisting in certain novel combinations and arrangements of parts hereinafter described and particularly set out in the appended claims.

Figure 1:
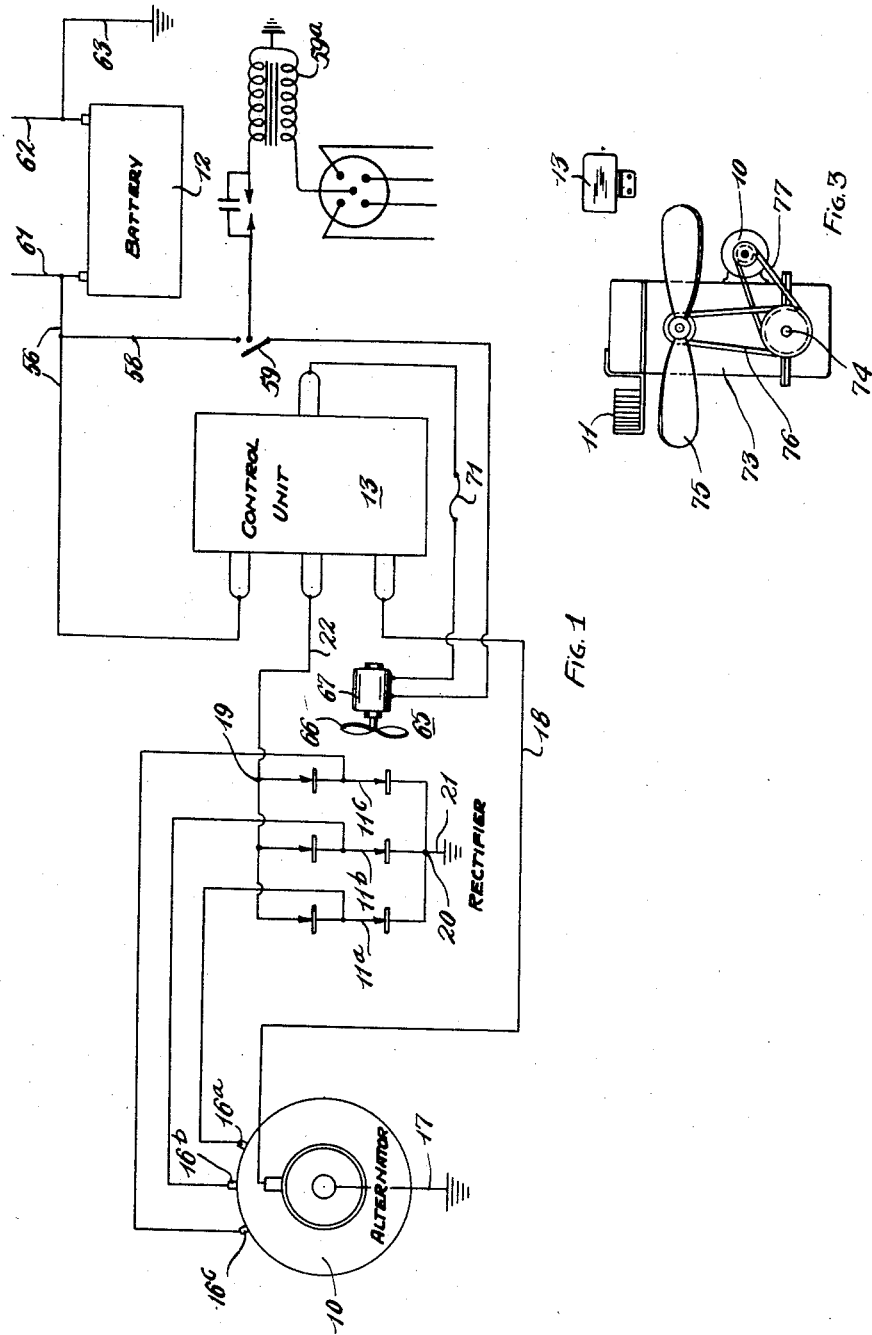
Figure 2:
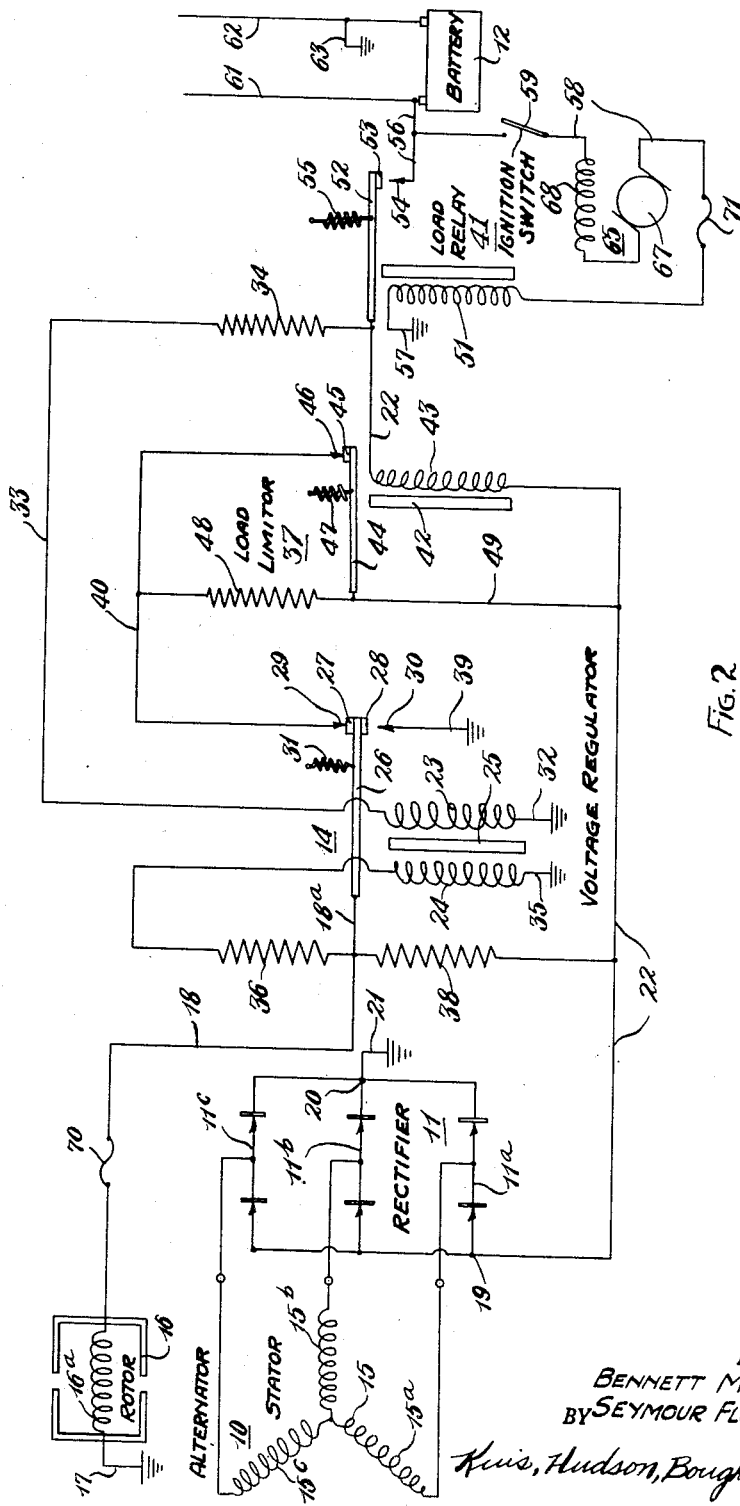

In the accompanying sheets of drawings,

Fig. 1 is a diagrammatic view showing one form of a vehicle electrical system embodying this invention, Fig. 2 is a wiring diagram further illustrating the apparatus and circuits embodied in the system of Fig. 1, Fig. 3 is an end view showing a modification of the system of Fig. 1 in which the variable speed vehicle driving engine has a cooling means and the rectifier is being cooled by such cooling means, and Figs. 4 and 5 are wiring diagrams similar to Fig. 2 but showing other modifications of the improved system.

The vehicle electrical system of this invention comprises, in general, an alternator 10 which is driven by a variable speed vehicle driving engine or motor and a rectifier 11 through which the alternator is connected with a direct current load, the latter being shown in this instance as including a storage battery 12. The system also includes a control unit 13 which comprises one or more control devices to be described hereinafter. In the form of the system illustrated in Figs. 1 and 2, these control devices include a voltage regulator 14, a load limiter or current regulator 37, and a load relay 41. This form of the system preferably also includes a cooling device 65 for cooling the rectifier.

Before proceeding with the detailed description of the improved system, it is deemed advisable to explain at this point an important difference between this system and the vehicle electrical systems heretofore used and in which a direct current generator is driven by the vehicle engine. In this improved system the alternator 10 is of a type adapted for satisfactory operation throughout a wide range of speeds which may run as high as 12,000 R. P. M. or higher. Because of this characteristic of the alternator the pulley ratio between the crankshaft and alternator can be relatively high so as to give a desired electrical output for the low engine speeds with little or no regard for the top speed at which the alternator may be driven when the engine is operating at its maximum R. P. M. This is in direct contrast to previous vehicle electrical systems embodying a direct current generator for the reason that in those systems such a high pulley ratio would be impractical, if not impossible, because of the high reactance voltage developed at the extreme generator speeds and because of the rapid brush wear and the damage which would occur to the commutator and other armature parts for such extreme generator speeds. This comparison illustrates for the improved system the important advantage of being able to deliver a high electrical output for the low operating speeds of the vehicle engine which will be adequate for the storage battery or other direct current load to be supplied, and this higher electrical output can be obtained without damage to any of the parts of the system when the vehicle engine is required to operate at its higher or maximum speeds.

The alternator 10 can be of any construction suitable for this type of service and is here shown as comprising a stator 15 having a so-called star-connected inductor winding composed of the coils or sections 15a, 15b and 15c, and a rotor 16 carrying a field winding or coil 16a. The field winding 16a has one end thereof connected with ground as indicated at 17 and has its other end connected with the control unit 13 by the conductor 18. These connections with the ends of the rotor winding can be made by the use of any suitable brush means and which permits operation of the alternator 10 in either direction of rotation.

The rectifier 11 may be of any construction suitable for the use of the rectifier in this system and is here shown as being a full wave dry plate rectifier of the bridge type. The stator coils 15a, 15b and 15c of the alternator 10 are connected with the rectifier at appropriate points of the three arms 11a, 11b and 11c of the bridge circuit as indicated in the drawings. The rectifier is provided with D. C. terminals 19 and 20 of which the terminal 20 is connected with a common ground by the ground connection 21. A load conductor 22 extending from the D. C. terminal 19 of the rectifier is connected with the control unit 13 and with the various devices of this unit as will be explained hereinafter.

The voltage regulator 14 may be any suitable form of voltage regulator or relay which will be capable of cooperating in a satisfactory manner with the alternator 10 and the rectifier 11 for controlling the alternator and maintaining a substantially constant terminal voltage at the D. C. side of the rectifier. In this instance the regulator 14 is shown as being of the electromagnetic vibratory type and the particular regulator here shown is of the kind known as a double contact regulator. This voltage regulator has a magnet winding comprising primary and secondary coils 23 and 24 disposed around a core 25 and also has a vibratory armature 26 carrying movable contacts 27 and 28. The regulator also includes a pair of stationary contacts 29 and 30 with which the movable contacts 27 and 28 cooperate respectively. A spring 31 acting on the armature normally urges the same in a direction to close the contacts 27 and 29.

The coil 23 of the regulator has one end thereof connected to ground as indicated at 32 and has its other end connected with the D. C. load conductor 22 through the conductor 33, the ballast resistance 34 and the series coil of the load limiter 37. One end of the coil 24 is also connected to ground as indicated at 35 and its other end is connected with the armature 26 of the regulator through the ballast resistance 36 and the portion 18a of the conductor 18. The field winding 16a is also connected with the armature 26 of the regulator through the conductors 18 and 18a. The regulator also includes a resistance 38 which is a so-called point resistance for the cooperating regulator contacts 27 and 29. One end of the resistance 38 is connected with the armature 26 by the conductor 18a and its other end is connected with the load conductor 22. The stationary contact 30 of the regulator is connected to ground as indicated at 39 and the stationary contact 29 is connected with the load conductor 22 through the conductor 40 and through the load limiter 37.

A voltage regulator of the kind above described is more fully disclosed in Leece Patents Nos. 2,052,047 and 2,052,048 granted August 25, 1936. This regulator controls the operation of the alternator 10 so as to maintain a desired substantially constant voltage at the D. C. terminals 19 and 20 of the rectifier 11. In accomplishing this purpose the coils 23 and 24 are energized by the alternator and cause a vibratory action of the armature 26 which, in turn, causes a rapid opening and closing of the regulator contacts. As variations occur in the speed of operation of the alternator, corresponding variations take place in the energization of the coils 23 and 24 with a variable effect on the opening and closing of the regulator contacts.

The opening and closing of the contacts 27 and 29 causes the resistance 38 to be intermittently inserted into, and short-circuited out of, the energizing circuit for the field winding 16a. When the variations in the operating conditions of the alternator are such that the amplitude of movement of the armature 26 causes intermittent closing of the contacts 28 and 30, a more effective regulating action is produced during which the field winding 16a is intermittently short-circuited, and simultaneously, the resistance 38 is intermittently connected across the terminals 19 and 20 of the rectifier 11 so as to constitute an auxiliary or stabilizing load for the alternator. Such intermittent short-circuiting of the field winding 16a and connecting the resistance 38 in circuit with the alternator as an auxiliary load, causes a sudden collapse of the magnetic field produced by the winding 16a and results in an effective regulating action on the operation of the alternator.

The load limiter or current regulator 37 comprises a magnet 42 having a winding 43 located in series in the load conductor 22 and a vibratory armature 44. The armature 44 carries a movable contact 45 which cooperates with a stationary contact 46. A spring 47 acting on the armature 44 urges the movable contact 45 toward engagement with the stationary contact 46. The load limiter also includes a point resistance 48 which is connected across the contacts 45 and 46 with the load conductor 22 through the connection 49, so that opening of these contacts will cause this resistance to be inserted into, or short-circuited out of, the energizing circuit for the field coil 16a of the alternator 10.

The energizing coil 43 of the load limiter is of such characteristics that when the current which is being delivered by the alternator through the conductor 22 to the direct current load 12 is a desired value, such as 60 amperes, the vibratory operation of the load limiter will cooperate with the voltage regulator 14 in maintaining the operation of the alternator such as to deliver this amount of current. If the alternator attempts to deliver current in excess of the desired value, the series coil 43 will vary the operation of the load limiter so as to increase the time interval during which the resistance 48 is maintained in the energizing circuit for the field coil 16a of the alternator. The use of the load limiter 37 in this system is desirable for protecting the apparatus against damage from overload, particularly the rectifier 11, which might otherwise become overheated.

The load relay 41 comprises a magnet winding 51 and a movable armature 52 carrying a movable contact 53 which cooperates with a stationary contact 54. A spring 55 acts on the armature 52 to normally urge the movable contact 53 away from the stationary contact 54. The stationary contact 54 is connected with the direct current load 12 by the load conductor 56. One end of the magnet winding 51 is connected with ground as indicated at 57 and its other end is connected with the load conductor 56 by the conductor 58.

The use of the load relay 41 in this system is desirable when the direct current load to be supplied includes a storage battery, as shown in this instance, because it prevents a return flow of current from the battery when the alternator 10 is not being driven. The energization of the magnet winding 51 of the load relay is controlled by a manual switch 59 located in the conductor 58. The switch 59 is preferably also the ignition switch controlling the ignition apparatus 59a of the vehicle driving engine because the closing of the ignition switch in starting the vehicle engine will also cause closing of the load relay at the proper time for the delivery of current to the load by the alternator, and similarly, the opening of the ignition switch to stop the vehicle engine will also cause opening of the relay contacts 53 and 54 to disconnect the load from the alternator. In those cases where an ignition switch is not needed, such as where the alternator is driven by a Diesel engine, the purpose of the switch 59 is solely to control the load relay 41.

As mentioned above, the direct current load to which current is delivered by the alternator 10 may consist of, or may include, the storage battery 12. The drawings also show a pair of load conductors 61 and 62 connected with the battery and by which an additional load, such as radio apparatus or vehicle lights, can be supplied with electric current. The load conductor 62 and the corresponding terminal of the battery are connected with ground as indicated at 63.

A provision for cooling the rectifier 11 is an important part of the improved system. This cooling can be accomplished in various ways, for example, by the separate motor driven cooling device 65 as shown in Figs. 1 and 2, or by means of the cooling fan of the vehicle driving engine as hereinafter explained in connection with Fig. 3. The cooling device 65 comprises a fan 66 which directs air against the rectifier 11 and is driven by an electric motor 67. The motor 67 is preferably a series motor having its field winding 68 connected in series with the energizing coil 51 of the load relay 41.

When the rectifier 11 is cooled by the use of a series motor connected in the manner just described, it will be seen that the closing of the switch 59 to place the system in operation will also cause energization of this motor so as to immediately begin the supply of cooling air to the rectifier. Likewise the opening of the switch 59 to render the system inoperative will simultaneously stop the cooling motor 67. Moreover, if the cooling motor 67 should fail, such as by its field coil or armature winding becoming burned out, this will automatically render the system inoperative so that the rectifier cannot be subjected to overheating.

As shown in Fig. 2 the improved system may embody protective devices at various points such as the fuses 70 and 71. The fuse 70 is located in the energizing circuit for the field winding 16a and the fuse 71 is in the load circuit and therefore also in the circuit of the series motor 67.

In the improved system it will be observed that the field winding 16a is energized from the inductor winding 15 of the alternator 10 and that the current for the field winding is supplied thereto through the rectifier 11. The alternator here shown is therefore a self-excited alternator in which the field winding is energized from the D. S. terminals 19 and 20 of the rectifier.

Fig. 3 of the drawings shows one manner in which the alternator 10 can be driven from a variable speed vehicle engine 73 and embodies a modified arrangement for cooling the rectifier 11. The engine 73 can be an engine or motor of any appropriate type or construction such as a reciprocating internal combustion engine having a driven shaft 74. The engine here shown embodies a rotary cooling device in the form of a fan 75 which is driven from the shaft 74 by the belt 76. Fig. 3 also shows the alternator 10, the rectifier 11 and the control unit 13 all located adjacent the engine and it is a feature of the present invention that the rectifier is cooled by air from the engine cooling fan 75. For this purpose the rectifier is located in the air stream from the fan as by being mounted at a suitable point on the engine. The alternator 10 is connected with the shaft 74 by suitable torque transmitting means such as the belt 77 and pulleys of appropriate size around which it extends. The control unit 13 can be mounted at any convenient point on the vehicle such as on the engine side of the dashboard.

It is not necessary that the improved system always include the above described load limiter or current regulator 37. Fig. 4 of the drawings shows a modified form of the system in which the load limiter has been omitted and the output is limited to the desired maximum value by the construction of the alternator. This accomplished by building the alternator 80 so that the inherent reactance of the inductor winding 81 will be such as to limit the output and prevent the same from materially exceeding a desired maximum value. The various other parts of the system of Fig. 4 are substantially the same as corresponding parts of the system of Fig. 2 and are designated by the same reference characters.

Fig. 5 of the drawings shows another modified system in which the load limiter 37 has been omitted and the output is controlled or limited by the use of reactance in the system. The system illustrated in Fig. 5 is the same as in Fig. 4 except that the reactance is outside of the alternator and is located between the inductor coils and the rectifier 11. For this purpose an air core reactor coil 83 is located in each conductor connecting the inductor coils 15a, 15 b and 15 c with the A. C. side of the rectifier. The reactances of the external coils 83 are in addition to the inherent reactance of the alternator and has a value such that the total reactance will limit the output current to the desired predetermined value. The reactor coils 83 are of a construction suitable for the service which they are to render and preferably have a relatively low resistance so as to minimize line losses and heating effects. The use of a reactance in the system, as explained above in connection with Figs. 4 and 5, will protect the rectifier and the various other devices against overload. It will also serve to limit the short-circuit current should a fault occur in the rectifier.

Although a cooling means for the rectifier is shown in Figs. 2, 4 and 5, it will be understood that this cooling means can be omitted entirely, if desired, or the cooling can be accomplished by the engine fan in the manner illustrated in Fig. 3.

From the foregoing description and the accompanying drawings it will now be readily understood that this invention provides an improved electrical system for motor vehicles having a variable speed driving engine. It will also be seen that by using a rectifier and a voltage regulator in combination with an alternator driven by the variable speed vehicle engine, a high electrical output can be obtained for the lower engine speeds without subjecting any of the apparatus to a dangerous or harmful operating condition for the higher operating speeds of the vehicle engine. Moreover, an additional advantage is obtained in this improved system by having the rectifier cooled as by the cooling means explained above. A further advantage of the improved system is that the alternator 10 can be operated in either direction of rotation and the functioning of the system will be exactly the same for both directions of rotation. This last mentioned advantage is of particular importance in marine and railway vehicles and in any other vehicle in which the driving means is reversible. Although the drawings show a common ground being used for one side of the circuit, it is obvious that a two conductor circuit could be used in the same system if desired.

Although our invention has been illustrated and described herein in more or less detail, it will be understood of course that the invention is not intended to be correspondingly limited in scope but should be regarded as including all changes and modifications coming within the scope of the appended claims.

Having thus described our invention, we claim:

1. In combination with a motor vehicle having a driving engine, an electrical system for supplying power to a direct current load comprising an alternator, torque transmitting means connecting the alternator with said engine to be driven thereby, a rectifier, means connecting said rectifier and direct current load in circuit with said alternator, voltage regulating means of the electromagnetic vibratory type connected with said alternator and rectifier and operable by rectified current from the latter to regulate the operation of said alternator for controlling the terminal voltage of the alternator, and a load limiting device of the electromagnetic vibratory type in said circuit and operable to limit the power delivery through the circuit to a predetermined safe value for the rectifier.

2. An electrical system for a motor vehicle having a variable speed driving engine comprising, an alternator, torque transmitting means connecting said alternator with said engine to be driven thereby, a storage battery, a rectifier, means connecting said rectifier and battery with said alternator so as to establish a charging circuit for charging the battery from the alternator through said rectifier, voltage regulating means of the electromagnetic vibratory type connected with said alternator and operable by rectified current from the rectifier to regulate the operation of said alternator for controlling the terminal voltage thereof, and a load limiting device in said circuit and operable to limit the power delivery through the circuit to a predetermined safe value for the rectifier.

3. An electrical system for a motor vehicle having a variable speed internal combustion driving engine and an ignition switch comprising, an alternator having inductor coils and a field winding, torque transmitting means connecting said alternator with said engine to be driven thereby, a storage battery, a rectifier, means connecting said rectifier and battery with said alternator so as to establish a charging circuit for charging the battery from the alternator through said rectifier, voltage regulating means of the electromagnetic vibratory type connected with said rectifier and field winding and operable to vary the supply of rectified current to said field winding so as to control the terminal voltage of said alternator, and a load relay having switch contacts in said circuit for controlling the same and a magnet coil connected so as to be energized through said ignition switch.

4. In combination with a motor vehicle having a driving motor, an electrical system for supplying power to a direct current load comprising an alternator having inductor coils and a field winding, torque transmitting means connecting the alternator with said motor to be driven thereby, a rectifier, means connecting said direct current load in circuit with said inductor coils through said rectifier, voltage regulating means of the electromagnetic vibratory type connecting said field winding with the D. C. side of said rectifier and operable to vary the supply of rectified current to said field winding from said rectifier so as to control the terminal voltage of said alternator, and a load limiting device of the electromagnetic vibratory type connected with said load circuit and said voltage regulating means and being operable to modify the action of the latter in controlling the supply of rectified current to said field winding so as to limit the power delivery through the circuit to a predetermined safe value for said rectifier.

5. An electrical system for a motor vehicle having a variable speed driving engine comprising, an alternator having inductor coils and a field winding, torque transmitting means connecting said alternator with said engine to be driven thereby, a storage battery, a rectifier, means connecting said rectifier and battery with said alternator so as to establish a charging circuit for charging the battery from the alternator through said rectifier, voltage regulating means of the electromagnetic vibratory type connecting said field winding with the D. C. side of said rectifier and operable to vary the supply of rectified current to said field winding from said rectifier so as to control the terminal voltage of said alternator, and a load limiting device of the electromagnetic vibratory type connected with said charging circuit and said voltage regulating means and being operable to modify the action of the latter in controlling the supply of rectified current to said field winding so as to limit the power delivery through the circuit to a predetermined safe value for said rectifier.

6. An electrical system for use with a motor vehicle having a variable speed driving motor for supplying power to a direct current load, comprising an alternator having field and inductor windings and adapted to be driven from the motor of the vehicle, a rectifier having direct current terminals, circuit means connecting said direct current load in circuit with said alternator through said rectifier, a field energizing circuit connecting said field winding with the direct current terminals of said rectifier, and electromagnetic voltage regulating means connected in circuit with the alternator between said rectifier and load, said regulating means including a resistance and one pair of vibratory contacts operable to intermittently connect said resistance into and short-circuit the same out of said field energizing circuit for varying the excitation of the field winding by rectified current supplied thereto and a second pair of vibratory contacts adapted to intermittently short-circuit said field winding for deenergizing the same.

7. An electrical system for use with a motor vehicle having a variable speed driving motor for supplying power to a direct current load, comprising an alternator having field and inductor windings and adapted to be driven from the motor of the vehicle, a rectifier having direct current terminals, circuit means connecting said direct current load in circuit with said alternator through said rectifier, a field energizing circuit connecting said field winding with the direct current terminals of said rectifier, electromagnetic voltage regulating means connected in circuit with the alternator between said rectifier and load and having vibratory contacts and a resistance adapted to be intermittently connected into and short-circuited out of said field energizing circuit by said contacts for varying the excitation of the field winding by rectified current supplied thereto, a load limiting device of the electromagnetic vibratory type connected with said load circuit and said voltage regulating means and being operable to modify the action of the latter in controlling the supply of rectified current to said field winding so as to limit the power delivery through the circuit to a predetermined safe value for said rectifier, said load limiting device including a pair of cooperating contacts and a resistance, and circuit means enabling the contacts of said load limiting device to connect the last mentioned resistance into and short-circuit the same out of said field energizing circuit.

8. An electrical system for use with a motor vehicle having a variable speed driving motor for supplying power to a direct current load, comprising an alternator having field and inductor windings and adapted to be driven from the motor of the vehicle, a rectifier having direct current terminals, circuit means connecting said direct current load in circuit with said alternator through said rectifier, a field energizing circuit connecting said field winding with the direct current terminals of said rectifier, electromagnetic voltage regulating means connected in circuit with the alternator between said rectifier and load, said regulating means including a resistance and one pair of vibratory contacts operable to intermittently connect said resistance into and short-circuit the same out of said field energizing circuit for varying the excitation of the field winding by rectified current supplied thereto and a second pair of vibratory contacts adapted to intermittently short-circuit said field winding for deenergizing the same, a load limiting device of the electromagnetic vibratory type connected with said load circuit and said voltage regulating means and being operable to modify the action of the latter in controlling the supply of rectified current to said field winding so as to limit the power delivery through the circuit to a predetermined safe value for said rectifier, said load limiting device including a pair of cooperating contacts and a resistance, and circuit means enabling the contacts of said load limiting device to connect the last mentioned resistance into and short-circuit the same out of said field energizing circuit.

9. In combination with a motor vehicle having a variable speed internal combustion driving motor, an electrical system for supplying power to a direct current load comprising an alternator having inductor coils and a field winding, torque transmitting means connecting the alternator with said motor to be driven thereby, a rectifier, means connecting said direct current load in circuit with said inductor coils through said rectifier, voltage regulating means of the electromagnetic vibratory type connecting said field winding with the direct current side of said rectifier and operable to vary the supply of rectified current to said field winding from said rectifier so as to control the terminal voltage of said alternator, a fluid flow producing device for cooling said rectifier, an electric motor for driving said flow producing device, a load relay having switch contacts in the load circuit for controlling the same and a magnet coil for actuating said switch contacts, and an energizing circuit common to said electric motor and said magnet coil.

10. In combination with a motor vehicle having a variable speed internal combustion driving motor and an ignition switch, an electrical system for supplying power to a direct current load comprising an alternator having inductor coils and a field winding, torque transmitting means connecting the alternator with said motor to be driven thereby, a rectifier, means connecting said direct current load in circuit with said inductor coils through said rectifier, voltage regulating means of the electromagnetic vibratory type connecting said field winding with the direct current side of said rectifier and operable to vary the supply of rectified current to said field winding from said rectifier so as to control the terminal voltage of said alternator, a fluid flow producing device for cooling said rectifier, an electric motor for driving said flow producing device, a load relay having switch contacts in the load circuit for controlling the same and a magnet coil for actuating said switch contacts, an energizing circuit for energizing said magnet coil through said ignition switch, and a series motor mechanically connected with said flow producing device for driving the same and electrically connected in the energizing circuit for said magnet coil.

BENNETT M. LEECE.
SEYMOUR FLOYD STEWART.

REFERENCES CITED

The following references are of record in the file of this patent:

UNITED STATES PATENTS

| Number | Name | Date |
| --- | --- | --- |
| 475,514 | McElroy | May 24, 1892 |
| 1,169,465 | Creveling | Jan. 25, 1916 |
| 1,180,776 | Laycock | Apr. 25, 1916 |
| 1,205,181 | Fessenden, Jr. | Nov. 21, 1916 |
| 1,260,647 | Conrad | Mar. 26, 1918 |
| 1,421,285 | Mikolasek | June 27, 1922 |
| 1,448,484 | Fornaca | Mar. 13, 1923 |
| 1,876,548 | Atherton | Sept. 13, 1932 |
| 1,894,119 | Pratt | Jan. 10, 1933 |
| 1,920,618 | Zierdt | Aug. 1, 1933 |
| 1,941,863 | Johnson | Jan. 2, 1934 |
| 2,012,588 | Logan | Aug. 27, 1935 |
| 2,033,014 | Thompson et al. | Mar. 3, 1936 |
| 2,117,018 | Conrad et al. | May 10, 1938 |
| 2,117,141 | Breer et al. | May 10, 1938 |
| 2,125,110 | Harty | July 26, 1938 |
| 2,209,051 | Clayton | July 23, 1940 |
| 2,230,508 | Beer et al. | Feb. 4, 1941 |
| 2,233,586 | Conrad | Mar. 4, 1941 |
| 2,367,960 | Parfilt | Jan. 23, 1945 |